(12) United States Patent
Hays

(10) Patent No.: US 9,820,019 B2
(45) Date of Patent: Nov. 14, 2017

(54) TRANSMITTER WITH A RELATIVE-TIME TIMER

(75) Inventor: Paul J Hays, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 326 days.

(21) Appl. No.: 13/124,695

(22) PCT Filed: Nov. 13, 2008

(86) PCT No.: PCT/US2008/083432
§ 371 (c)(1),
(2), (4) Date: Apr. 18, 2011

(87) PCT Pub. No.: WO2010/056246
PCT Pub. Date: May 20, 2010

(65) Prior Publication Data
US 2011/0207417 A1    Aug. 25, 2011

(51) Int. Cl.
*H04Q 9/00* (2006.01)
*H04Q 9/04* (2006.01)
*G05B 19/408* (2006.01)

(52) U.S. Cl.
CPC .......... *H04Q 9/04* (2013.01); *G05B 19/408* (2013.01); *G05B 2219/31126* (2013.01); *G05B 2219/34413* (2013.01)

(58) Field of Classification Search
CPC .................................................. H04B 13/005
USPC .... 455/41.1, 41.2, 41.3, 67.11, 115.1, 115.4; 340/637, 606, 618; 702/60, 61, 69, 78, 702/79, 89
See application file for complete search history.

(56) References Cited

U.S. PATENT DOCUMENTS

| | | | |
|---|---|---|---|
| 5,027,297 A * | 6/1991 | Garitty et al. | ................. 702/187 |
| 5,825,648 A * | 10/1998 | Karnowski | ............. H02J 9/061 |
| | | | 700/16 |
| 6,014,089 A | 1/2000 | Tracy et al. | |
| 6,078,873 A * | 6/2000 | Shutty et al. | .................... 702/89 |
| 6,336,900 B1 * | 1/2002 | Alleckson et al. | ........... 600/485 |
| 6,633,825 B2 | 10/2003 | Burns et al. | |
| 6,876,952 B1 | 4/2005 | Kappler et al. | |
| 6,946,972 B2 | 9/2005 | Mueller et al. | |
| 7,433,321 B2 | 10/2008 | Grilli et al. | |
| 2005/0116780 A1* | 6/2005 | Endo et al. | ....................... 331/2 |
| 2007/0223537 A1 | 9/2007 | Crowle et al. | |
| 2008/0228331 A1 | 9/2008 | McNerney et al. | |

FOREIGN PATENT DOCUMENTS

| | | |
|---|---|---|
| CN | 101035035 | 9/2007 |
| CN | 101043451 A | 9/2007 |
| CN | 101056249 A | 10/2007 |
| CN | 101197944 A | 6/2008 |
| EP | 1239620 A2 | 11/2002 |
| JP | 2000135458 A | 5/2000 |

(Continued)

*Primary Examiner* — Ping Hsieh
(74) *Attorney, Agent, or Firm* — The Ollila Law Group LLC

(57) ABSTRACT

A transmitter (102) is provided. The transmitter (102) comprises a first communication interface (112) for receiving data. The transmitter (102) also comprises a timer (104) for measuring a relative-time and a processing system (110) for providing the data with a relative-time timestamp. A second communication interface (105) is provided for outputting the relative-time timestamped data.

24 Claims, 3 Drawing Sheets

(56) References Cited

FOREIGN PATENT DOCUMENTS

| | | |
|---|---|---|
| JP | 2004272403 | 9/2004 |
| JP | 2005-044192 | 2/2005 |
| JP | 2007038326 A | 2/2007 |
| KR | 910007399 B1 | 9/1991 |
| SU | 1840576 A1 | 9/2007 |
| WO | 2007015145 A2 | 2/2007 |

* cited by examiner

TRANSMITTER WITH A RELATIVE-TIME TIMER

TECHNICAL FIELD

The present invention relates to data transmitters, and more particularly, to data transmitters having a relative-time timer for generating relative-time timestamps for transmitted data.

BACKGROUND OF THE INVENTION

Transmitters are used in a variety of industries and their uses differ widely. However, one particular implementation is a transmitter in communication with a measuring instrument, such as a fluid flow meter. Typically, the fluid flow meter is connected inline in a pipeline or the like and therefore is generally located remote from a central control station or other processing system. The transmitter may receive signals from the flow meter and transmit the signals to a control system or the like for further processing.

In certain situations, a vast amount of information may be transmitted to the control system without a user/operator actually examining the information. There may be significant gaps in time before the data transmitted to the control system is examined. In some situations, the data may not be examined unless there is a detected problem in the flow. Once a problem is detected, the operator may have to review the data and correlate that data to an event that occurred at a specific time. Therefore, transmitters are typically equipped with a real-time clock so that each piece of data sent to the control system can be timestamped for later review.

The use of a real-time clock certainly has advantages in that the clock can accurately monitor when certain events occur. The event may relate to certain flow conditions, for example. One problem with the use of a real-time clock is that in order to maintain an accurate time, the clock must be provided with power even during times when the transmitter is not being used, i.e., the transmitter is not powered. Therefore, prior art transmitters having real-time clocks have required a battery backup to power the clock during periods of non-use. The use of battery backups may not be practical for a number of reasons, including cost and space considerations. The alternative to having a battery is to constantly provide power to the transmitter even during periods when the transmitter is not transmitting information to the control system. This solution may not be practical for various other reasons. For example, if the flow meter is operating under a power constraint, the additional power required to operate the real-time clock may not be available during all times. Furthermore, during extended periods between uses, continuously supplying power may not be justified. If the real-time clock temporarily lost power, the transmitter could send data having an incorrect timestamp. The error may not be discovered for an extended period of time. The incorrect timestamp may prevent a user/operator from diagnosing a problem in the flow meter, for example. Therefore, an accurate timestamp can provide significant information to the user/operator.

Therefore, there exists a need in the art to provide a process control system that can accurately assign a real-time timestamp to measurements without the drawbacks associated with providing the transmitter a real-time clock. The present invention solves this and other problems and an advance in the art is achieved.

ASPECTS

According to an aspect of the invention, a transmitter comprises:
 a first communication interface for receiving data;
 a timer for measuring a relative-time;
 processing system for providing the data with a relative-time timestamp; and
 a second communication interface for outputting the relative-time timestamped data.

Preferably, the transmitter further comprises a transmitter memory for storing the data along with the relative-time timestamp.

Preferably, the data comprises flow measurement information.

According to another aspect of the invention, a control system comprises:
 a communication interface for receiving data including a relative-time timestamp;
 a real-time clock for measuring a real-time; and
 a processing system for generating a real-time timestamp based on the relative-time timestamp.

Preferably, the control system further comprises a control system memory adapted to store data received by the control system along with the real-time timestamp provided by the processing system.

Preferably, the data comprises flow measurement information.

According to another aspect of the invention, a process control system comprises:
 a transmitter, including:
  a first communication interface for receiving data;
  a timer for measuring a relative-time;
  a processing system for providing the data with a relative-time timestamp;
  a second communication interface for outputting the relative-time timestamped data; and
 a control system in communication with the transmitter, including:
  a real-time clock for measuring a real-time; and
  a processing system for generating a real-time timestamp based on the relative-time timestamp.

Preferably, the process control system further comprises a transmitter memory for storing the data along with the relative-time timestamp.

Preferably, the process control system further comprises a control system memory adapted to store data transmitted to the control system along with the real-time timestamp provided by the control system.

Preferably, the process control system further comprises a measuring device in communication with the transmitter and adapted to send the data to the transmitter.

According to another aspect of the invention, a method for generating a timestamp for data comprises the steps of:
 measuring a relative-time;
 receiving data; and
 generating a relative-time timestamp for the data based on the measured relative-time.

Preferably, the step of measuring a relative-time comprises resetting a timer to a baseline when power is provided to the timer.

Preferably, the method further comprises the step of storing the data including the relative-time timestamp in a memory of a transmitter.

Preferably, the step of receiving data comprises receiving flow measurement information.

Preferably, the method further comprises the steps of:
transmitting the data to a control system, wherein the control system measures a real-time; and
generating a real-time timestamp based on the relative-time timestamp.

Preferably, the step of generating the real-time timestamp comprises recording a real-time start time of the relative-time and comparing the real-time start time to the relative-time timestamp.

Preferably, the step of generating the real-time timestamp comprises:
measuring a current elapsed time, representing the length of time a transmitter has been powered;
comparing the current elapsed time to a current real-time to generate a real-time start time; and
comparing the real-time start time to the relative-time timestamp to generate a real-time timestamp.

Preferably, the method further comprises the step of storing the data including the real-time timestamp in a memory of a control system.

Preferably, the step of transmitting the data to the control system comprises transmitting the data from a transmitter.

Preferably, the method further comprises the step of compensating the real-time timestamp for a transmission delay.

DETAILED DESCRIPTION OF THE INVENTION

Figure 1:
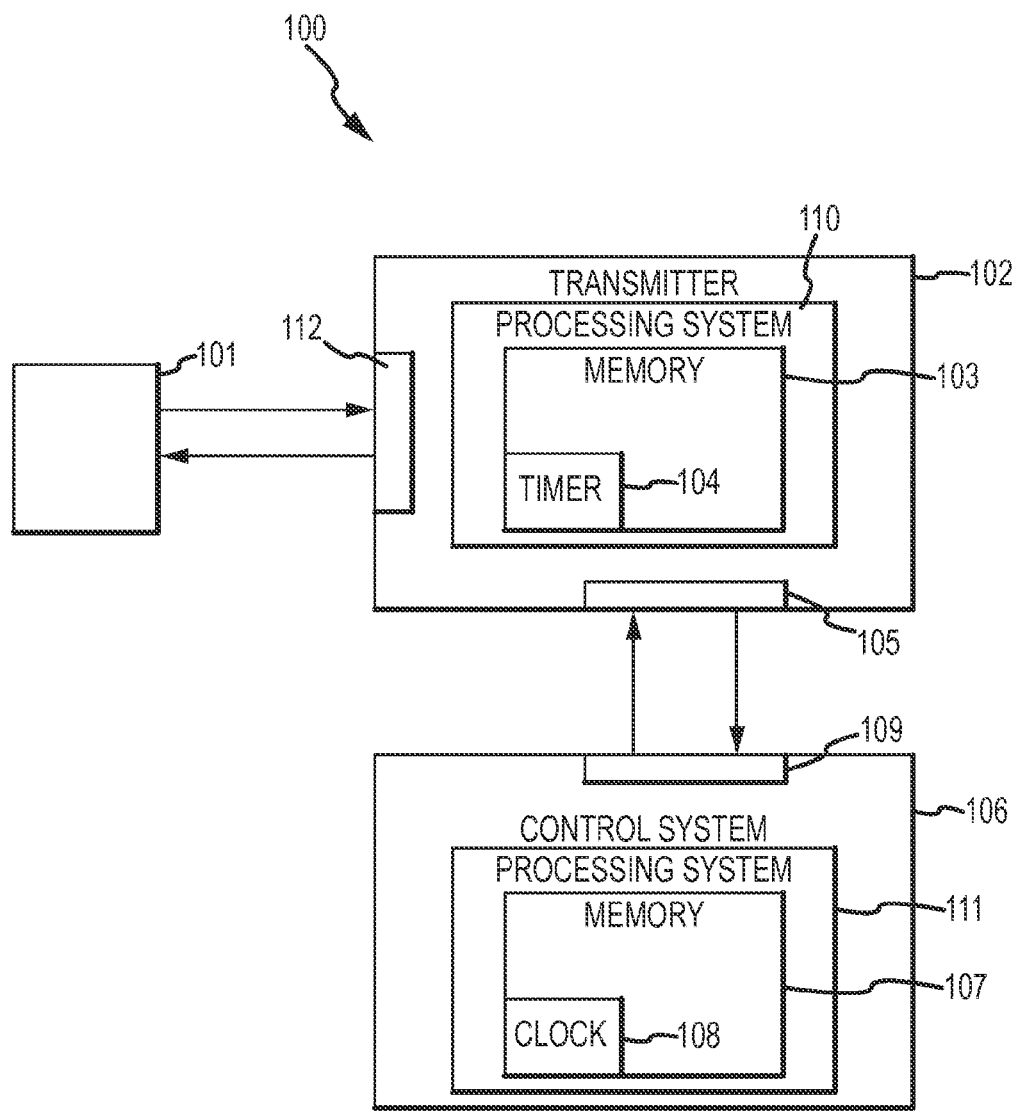
FIG. 1 shows a data processing system 100 according to an embodiment of the invention.
Figure 2:
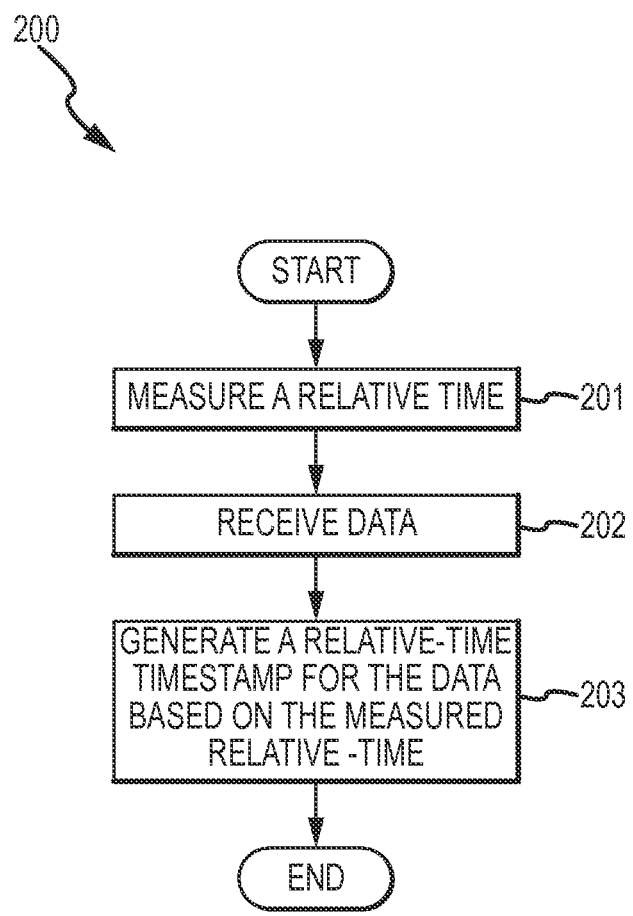
FIG. 2 shows a timestamp routine according to an embodiment of the invention.
Figure 3:
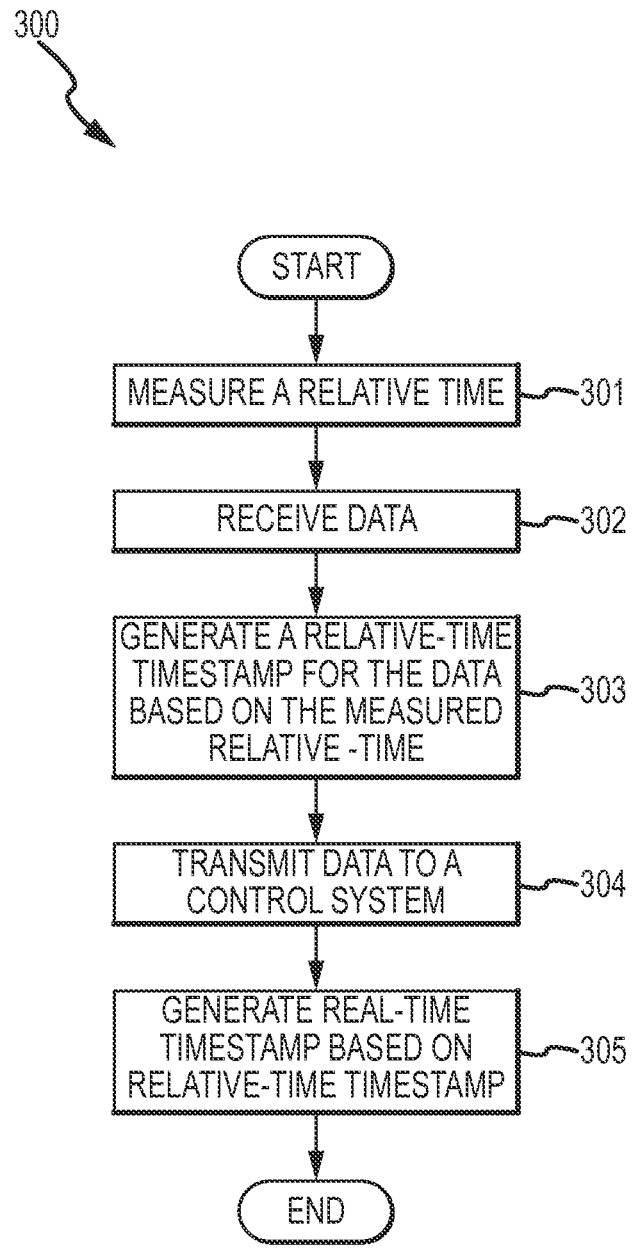
FIG. 3 shows a timestamp routine according to another embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 shows a data processing system 100 according to an embodiment of the invention. The data processing system 100 according to the embodiment shown in FIG. 1 includes a measuring device 101, a transmitter 102, and a control system 106. It should be understood that while the discussion below is directed to a flow meter 101, the transmitter 102 may receive information from a wide variety of other devices and a flow meter is shown only as one example. Therefore, the present invention should not be limited to flow meters and flow measurements.

According to an embodiment of the invention, the transmitter 102 communicates with both the flow meter 101 and the control system 106. Communication may occur through wire leads, or alternatively, the devices may communicate using wireless technology as is generally known in the art.

According to an embodiment of the invention, the transmitter 102 includes a first communication interface 112 and a second communication interface 105. According to an embodiment of the invention, the communication interface 112 can receive data, such as flow measurement information from the flow meter 101. In some embodiments, the first communication interface 112 may be able to output information to the flow meter 101 as well. According to an embodiment of the invention, the transmitter 102 also includes a second communication interface 105. The second communication interface 105 can transmit data to the control system 106 or similar device for further processing and/or storage.

According to an embodiment of the invention, the flow meter 101 may measure mass flow rate, a volumetric flow rate, a fluid density, and the like along with other flow characteristics. The flow meter 101 may also include a temperature measuring device such as an RTD. The flow meter 101 can communicate the flow characteristics to the transmitter 102. The flow meter 101 may communicate the flow characteristics to the transmitter 102 substantially immediately upon measurement. Therefore, the transmitter 102 can receive the flow characteristics as the flow meter 101 is measuring the flow characteristics. Depending on the components used for communication, there may be a transmission delay. The delay may be caused by either the flow meter 101 or the transmitter 102. The delay may also be caused by a time required for the information to travel from the flow meter 101 to the transmitter 102. The transmission delay may need to be taken into account in subsequent processing. In other embodiments, the transmission delay may be insubstantial and therefore, the time the transmitter 102 receives the flow characteristics can be considered to comprise the time when the measurements were taken by the flow meter 101.

According to an embodiment of the invention, data obtained from the flow meter 101 can be stored in a memory 103 or the like before being sent to the control system 106 for further processing. The memory 103 may include a timer 104. The timer 104 can measure a "relative" time. The relative-time may comprise an elapsed time, for example. According to an embodiment of the invention, the elapsed time may indicate the amount of time since the transmitter 102 has been powered. According to another embodiment of the invention, the elapsed time may indicate the amount of time the transmitter 102 has been receiving data. The relative-time timer 104 may comprise a quartz crystal, for example. However, the timer 104 does not have to comprise a quartz crystal. The particular timer used for the timer 104 is not important for the purposes of the present invention and therefore, should not limit the scope of the present invention. According to an embodiment of the invention, the timer 104 may reset and begin counting from a baseline time when power is provided to the transmitter 102. The baseline time may be zero, or may comprise some other predetermined time. A processing system 110 in the transmitter 102 may timestamp the incoming data with the relative-time measured by the timer 104. According to an embodiment of the invention, the relative-time is based on the elapsed time the transmitter 102 has been powered on as calculated by the timer 104. In some embodiments, the timer 104 may provide the timestamp as the data is being stored in the buffer memory 103 rather than when the measurements are first received.

According to an embodiment of the invention, the transmitter 102 may output the data including the relative-time timestamp through the data output 105. The second communication interface 105 may comprise any manner of interface suitable for sending data between the transmitter 102 and the control system 106. In some embodiments, the second communication interface 105 may also be capable of receiving information from the control system 106. The second communication interface 105 may comprise wire leads, or a wireless communication interface. The particular interface 105 used may depend on the particular situation. For example, if the transmitter 102 is located a great distance away from the control system 106, wire leads may prove too expensive to be practical. Therefore, a wireless interface may be more practical.

The data may be processed using the relative-time timestamp or alternatively, a control system, such as control system 106 may process the data and convert the relative-time timestamp into a real-time timestamp.

In some embodiments, the communication interface 105 may provide both communication and power to the transmitter 102. For example, the communication interface 105 may comprise a two-wire bus loop for example. Two-wire bus loops may allow the transmitter 102 to operate in intrinsically safe environments as the total current supplied to the transmitter 102 is generally limited to vary between approximately 4-20 mA. In embodiments where the control system 106 provides power to the transmitter 102, the control system 106 can easily determine when the timer 104 is powered and therefore, can determine when the timer 104 begins counting. In other embodiments, where the control system 106 does not provide power to the transmitter 102, the transmitter 102 may send a signal to the control system 106 substantially immediately upon powering. The signal sent to the control system 106 can provide the control system 106 with a baseline or a start time. A processing system 111 in the control system 106 can use the baseline time to convert the relative-time timestamp into a real-time timestamp as provided below.

According to the embodiment shown in FIG. 1, the control system 106 includes a communication interface 109, a processing system 111, a memory 107, and a real-time clock 108. The control system 106 can comprise a general purpose computer, a micro-processing system, a logic circuit, a digital signal processor, or some other general purpose or customized processing device. The control system 106 can be distributed among multiple processing devices. The control system 106 can include any manner of integral or independent electronic storage medium, such as the internal memory 107. It should be appreciated that the control system 106 may include many other components that are omitted from the drawings and discussion for the purpose of simplifying the description.

The real-time clock 108 included in the control system 106 can comprise a real-time clock as is generally included in processing systems. The real-time clock 108 can be utilized during a timestamp routine 200 as described below.

FIG. 2 shows a timestamp routine 200 according to an embodiment of the invention. The timestamp routine 200 can be utilized to provide a relative-time timestamp for data received by the transmitter 102. The timestamp routine 200 can start in step 201 where a relative-time is measured. The relative-time can be measured using the timer 104, for example. According to an embodiment of the invention, the timer 104 can begin counting as soon as power is provided to the transmitter 102. According to an embodiment of the invention, the timer 104 can continue to measure the relative-time until power is removed from the transmitter 102. The timer 104 can therefore keep an elapsed "on time" of the transmitter 102.

In step 202, the transmitter 102 can receive data. The transmitter may receive data through the first communication interface 112, for example. In embodiments where the transmitter 102 communicates with a flow meter, such as flow meter 101, the data may comprise flow measurement information. However, it should be understood that the data may comprise any type of data and the present invention should not be limited to flow measurement data.

In step 203, the transmitter 102 and more specifically, the processing system 110 can generate a relative-time timestamp for the data. The relative-time timestamp can be based on the relative-time measured by timer 104 in step 201. According to an embodiment of the invention, the data is timestamped as it is being stored in the memory 103. According to an embodiment of the invention, the time can be considered a "relative" time because the timestamp is not measured as an absolute or "real" time. It should be appreciated that "real-time" is meant to imply a time which is generally used in the field or other related equipment and may vary depending on the particular time zone the data processing system 100 is located. In contrast, "relative-time" is generated from a baseline, such as zero and is not the time generally used in the field by user/operators or other instrumentation.

The data in the transmitter 102 including the relative-time timestamp may be utilized without converting to a real-time. For example, in some situations, the real-time that a particular piece of data is received may not be as important as the time between consecutive pieces of data. Therefore, in some embodiments, the relative-time timestamp provides sufficient information without subsequent processing. However, if a real-time timestamp is required or desired, the timestamp routine 300 may be utilized rather than the timestamp routine 200.

FIG. 3 shows a timestamp routine 300 according to an embodiment of the invention. The timestamp routine 300 can be utilized to provide a real-time timestamp for the data received by the control system 106 from the transmitter 102. The timestamp routine 300 can start in step 301 where a relative-time is measured. The relative-time can be measured using timer 104, for example. According to an embodiment of the invention, the timer 104 can begin counting as soon as power is provided to the transmitter 102. According to an embodiment of the invention, the timer 104 can continue to measure the relative-time until power is removed from the transmitter 102. The timer 104 can therefore keep an elapsed "on time" of the transmitter 102.

In step 302, the transmitter 102 can receive data. The transmitter may receive data through the first communication interface 112, for example. In embodiments where the transmitter 102 communicates with a flow meter, such as flow meter 101, the data may comprise flow measurement information. However, it should be understood that the data may comprise any type of data and the present invention should not be limited to flow measurement data.

In step 303, the transmitter 102 and more specifically, the processing system 110 can generate a relative-time timestamp for the data. The relative-time timestamp can be based on the relative-time measured by timer 104 in step 201. According to an embodiment of the invention, the data is timestamped as it is being stored in the memory 103.

In step 304, the data stored in the transmitter 102, which has been timestamped with a relative-time can be sent to the control system 106. According to an embodiment of the invention, the relative-time timestamp is sent along with each piece of data. According to another embodiment, the transmitter 102 can timestamp the data at regular intervals.

In other words, not all of the data will include a timestamp. This may be practical for example, if the transmitter 102 receives the data at substantially regular intervals. According to an embodiment of the invention, the transmitter 102 can also send the current elapsed time as provided by the timer 104. The current elapsed time may be useful if the data is not sent substantially immediately, for example. Additionally, the current elapsed time may be useful if the control system 106 has not recorded the timer 104 start time, for example.

In step 305, the processing system 111 in the control system 106 can generate a real-time timestamp for the incoming data. According to an embodiment of the invention, the real-time timestamp can be based on a current elapsed time and the relative-time timestamp provided by the transmitter 102. According to another embodiment of the invention, the real-time timestamp can be based on the relative-time timestamp and real-time start time of the timer 104. According to an embodiment of the invention a current elapsed time can be provided by the timer 104 when the data is sent from the transmitter 102 to the control system 106. According to an embodiment of the invention, a current real-time can be provided by the real-time clock 108 included in the control system 106. The real-time timestamp can be calculated by subtracting the current elapsed time provided by the timer 104 from the current real-time as provided by the real-time clock 108. This calculation can provide the real-time start time of the timer 104. In other words, a real-time of when the timer 104 began counting can be determined. From the start time and the relative-time timestamp provided by the timer 104, a real-time timestamp can be provided for each measurement by adding the real-time start time to the relative-time timestamp. In other words, the start time can be added to the elapsed time for each measurement, thus providing a real-time timestamp. This gives the appearance that the transmitter 102 includes a real-time clock, such as the real-time clock 108 provided in the control system 106 while the transmitter 102 only includes a relative-time timer 104.

In some embodiments, the current elapsed time may not be available. For example, the current elapsed time may not be sent by the transmitter 102. Therefore, as mentioned above, the control system 106 may track the real-time start time of the timer 104. Therefore, the control system 106 may keep track of the real-time start time without having to calculate the start time later. According to this embodiment, the real-time timestamp can be calculated based on the relative-time timestamp and the real-time start time. Once the control system 106 receives the data from the transmitter 102 along with the relative-time timestamp, the control system 106 can simply compare the relative-time timestamp to the real-time start time as recorded by the control system 106. The comparison may comprise adding the real-time start time to the relative-time timestamp, for example. However, the particular comparison may depend on what the baseline time of the relative-time timestamp is. For example, if the baseline time comprises 24:00:00 rather than 00:00:00, then the comparison may comprise subtracting the relative-time timestamp from the real-time start time. Therefore, the current elapsed time does not need to be sent by the transmitter 102 in order to calculate a real-time timestamp.

According to an embodiment of the invention, the control system 106 may compensate for the transmission time required to transmit the data from the flow meter 101 to the transmitter 102 as well as the transmission time required to transmit data from the transmitter 102 to the control system 106. The compensation may comprise subtracting a predetermined amount of time off from the current elapsed time as provided by the timer 104, for example. According to another embodiment of the invention, the compensation may comprise subtracting a predetermined amount of time off from the real-time clock 108.

The method and apparatus described above provides an efficient and economical approach to providing a relative-time timestamp to data received by a transmitter. In some embodiments, the invention can then generate a real-time timestamp for data being transmitted to a control system without the drawbacks associated with the systems of the prior art. Although the invention has been described as including a flow meter, it should be appreciated that the present invention is equally applicable to other data transmitting systems and therefore should not be limited to the specific examples provided.

It should be appreciated that while the specific embodiments shown have described the transmitter 102 being in communication with the control system 106, other configurations are contemplated and within the scope of the claims. For example, the control system 106 may receive data including a relative-time timestamp from various other sources and not just a transmitter. Furthermore, the transmitter 102 may output the relative-time timestamped data to various other components and not just a control system 106. Therefore, it should be appreciated that each of the components described above can be used alone or in combination with one another.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other transmitters, and not just to the embodiments described above and shown in the accompanying figures. Accordingly, the scope of the invention should be determined from the following claims.

I claim:

1. A transmitter (102), comprising:
   a first communication interface (112) for receiving data;
   a timer (104) for measuring a relative-time, the measuring the relative-time including resetting the timer (104) to a baseline time when power is provided to the transmitter (102), the baseline time comprising a non-zero predetermined time;
   a processing system (110) for providing the data with a relative-time timestamp, the relative-time comprising an elapsed on-time of the transmitter (102), wherein the elapsed on-time is a length of time the transmitter (102) has been powered; and
   a second communication interface (105) for outputting the relative-time timestamped data and the baseline time to convert the relative-time timestamp to a real-time timestamp.

2. The transmitter (102) of claim 1, further comprising a memory (103) for storing the data along with the relative-time timestamp.

3. The transmitter (102) of claim 2, wherein the data is timestamped as it is being stored in the memory (103).

4. The transmitter (102) of claim 1, wherein the data comprises flow measurement information.

5. The transmitter (102) of claim 1, wherein the processing system (110) timestamps the data when the data is received by the first communication interface (112).

6. A control system (106), comprising:
   a communication interface (109) for receiving:
      data including a relative-time timestamp, the relative-time comprising an elapsed on-time of a transmitter (102), wherein the elapsed on-time is a length of time the transmitter (102) has been powered wherein measuring the relative-time includes resetting a timer (104) to a baseline time when power is provided to the transmitter (102), the baseline time comprising a non-zero predetermined time; and
      the baseline time to convert the relative-time timestamp to a real-time timestamp.

7. The control system (106) of claim 6, further comprising a control system memory (107) adapted to store data received by the control system (106).

8. The control system (106) of claim 6, wherein the data comprises flow measurement information.

9. A data processing system (100), comprising:
   a transmitter (102), including:
      a first communication interface (112) for receiving data;
      a timer (104) for measuring a relative-time, the measuring the relative-time including resetting the timer (104) to a baseline time when power is provided to the timer (104), the baseline time comprising a non-zero predetermined time;
      a processing system (110) for providing the data with a relative-time timestamp, the relative-time comprising an elapsed on-time of the transmitter (102), wherein the elapsed on-time is a length of time the transmitter (102) has been powered; and
      a second communication interface (105) for outputting the relative-time timestamped data and the baseline time to convert the relative-time timestamp to a real-time timestamp.

10. The data processing system (100) of claim 9, further comprising a memory (103) for storing the data along with the relative-time timestamp.

11. The data processing system (100) of claim 10, wherein the processing system (110) timestamps the data when the data is received by the first communication interface (112).

12. The data processing system (100) of claim 9, further comprising a control system memory (107) adapted to store data transmitted to the control system (106).

13. The data processing system (100) of claim 12, wherein the data is timestamped as it is being stored in the memory (103).

14. The data processing system (100) of claim 9, further comprising a measuring device (101) in communication with the transmitter (102) and adapted to send the data to the transmitter (102).

15. A method for generating a timestamp for data, comprising steps of:
    measuring a relative-time by resetting a timer to a baseline time when power is provided to a transmitter, the baseline time comprising a non-zero predetermined time for converting the relative-time timestamp to a real-time timestamp;
    receiving data; and
    generating a relative-time timestamp for the data based on the measured relative-time, the measured relative-time comprising an elapsed on-time of the transmitter, wherein the elapsed on-time is a length of time the transmitter has been powered without converting to a real-time.

16. The method of claim 15, further comprising a step of storing the data including the relative-time timestamp in a memory of a transmitter.

17. The method of claim 16, wherein the data is timestamped as it is being stored in the memory of the transmitter.

18. The method of claim 15, wherein the step of receiving data comprises receiving flow measurement information.

19. The method of claim 15, further comprising steps of:
    transmitting the data and the baseline time to a control system, wherein the control system measures a real-time; and
    generating a real-time timestamp based on the relative-time timestamp and the baseline time.

20. The method of claim 19, wherein the step of generating the real-time timestamp comprises recording a real-time start time of the relative-time using the baseline time and comparing the real-time start time to the relative-time timestamp.

21. The method of claim 19, wherein the step of generating the real-time timestamp comprises:
    comparing the current elapsed time to a current real-time to generate a real-time start time; and
    comparing the real-time start time to the relative-time timestamp to generate a real-time timestamp.

22. The method of claim 19, further comprising a step of storing the data including the real-time timestamp in a memory of a control system.

23. The method of claim 19, wherein the step of transmitting the data to the control system comprises transmitting the data and the baseline time from a transmitter.

24. The method of claim 19, further comprising a step of compensating the real-time timestamp for a transmission delay.

* * * * *